US008478268B2

(12) United States Patent
Cho et al.

(10) Patent No.: US 8,478,268 B2
(45) Date of Patent: *Jul. 2, 2013

(54) METHOD OF COMMUNICATING DATA IN A WIRELESS MOBILE COMMUNICATION SYSTEM

(75) Inventors: Ki Hyoung Cho, Anyang-si (KR); Yong Ho Kim, Bucheon-si (KR); Gi Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 169 days.

This patent is subject to a terminal disclaimer.

(21) Appl. No.: 12/833,876

(22) Filed: Jul. 9, 2010

(65) Prior Publication Data
US 2010/0273483 A1 Oct. 28, 2010

Related U.S. Application Data

(63) Continuation of application No. 11/165,662, filed on Jun. 24, 2005, now Pat. No. 7,778,640.

(30) Foreign Application Priority Data

Jun. 25, 2004 (KR) .......................... 10-2004-048423
Jun. 26, 2004 (KR) .......................... 10-2004-048618
Jul. 8, 2004 (KR) .......................... 10-2004-053151
Aug. 2, 2004 (KR) .......................... 10-2004-062984
Aug. 11, 2004 (KR) .......................... 10-2004-063248
Jan. 20, 2005 (KR) .......................... 10-2005-005201

(51) Int. Cl.
*H04Q 7/20* (2006.01)

(52) U.S. Cl.
USPC .................. 455/435.1; 455/435.2; 455/435.3; 455/422.1; 455/458; 370/241; 370/315; 370/338; 370/349; 370/498

(58) Field of Classification Search
USPC .................. 455/521.1, 411, 525, 466, 435.1, 455/435.2, 435.3; 370/252, 328, 338, 349; 375/260
See application file for complete search history.

(56) References Cited

U.S. PATENT DOCUMENTS 5,588,043 A 12/1996 Tiedemann, Jr. et al.
6,212,175 B1 * 4/2001 Harsch .......................... 370/338

(Continued)

FOREIGN PATENT DOCUMENTS

CN 1234707 11/1999
CN 1250581 4/2000

(Continued)

OTHER PUBLICATIONS

Kim, R. et al., "BS's Proxy ARPing for Sleep or Idle Mode MSSs," IEEE 802.16 Broadband Wireless Access Working Group, Jun. 25, 2004.

(Continued)

*Primary Examiner* — Patrick Edouard
*Assistant Examiner* — Fred Casca
(74) *Attorney, Agent, or Firm* — Lee, Hong, Degerman, Kang & Waimey

(57) ABSTRACT

A method of communicating data in a wireless communication system is disclosed. More specifically, a method discloses transmitting a request by a mobile subscriber station (MSS) to a network entity via a de-registration request message requesting the network entity to retain a preferred session information, and receiving a selected session information via a de-registration command response from the network entity.

21 Claims, 12 Drawing Sheets

U.S. PATENT DOCUMENTS

| | | | |
|---|---|---|---|
| 6,487,413 | B1 | 11/2002 | Suojasto |
| 6,490,455 | B1 | 12/2002 | Park et al. |
| 6,580,699 | B1 | 6/2003 | Manning et al. |
| 2002/0193110 | A1 | 12/2002 | Julka et al. |
| 2002/0193128 | A1* | 12/2002 | Park ............................... 455/466 |
| 2002/0196764 | A1* | 12/2002 | Shimizu ........................ 370/338 |
| 2003/0217157 | A1 | 11/2003 | Tung et al. |
| 2004/0018841 | A1 | 1/2004 | Trossen |
| 2004/0072578 | A1 | 4/2004 | Keutmann et al. |
| 2004/0121765 | A1 | 6/2004 | Idnani et al. |
| 2005/0122941 | A1* | 6/2005 | Wu et al. ....................... 370/338 |
| 2005/0272449 | A1 | 12/2005 | Gallagher et al. |
| 2008/0153491 | A1 | 6/2008 | Cho et al. |

FOREIGN PATENT DOCUMENTS

| | | |
|---|---|---|
| CN | 1493167 | 4/2004 |
| EP | 0883313 | 12/1998 |
| EP | 1235445 | 8/2002 |
| EP | 1286560 | 2/2003 |
| KR | 10-1999-0085121 | 12/1999 |
| KR | 10-2000-0056076 | 9/2000 |
| KR | 10-2002-0014566 | 2/2002 |
| KR | 2003/056107 | 7/2003 |
| KR | 10-2004-0054944 | 6/2004 |
| KR | 10-2005-0107533 | 11/2005 |
| WO | 2004/002051 | 12/2003 |
| WO | 2004/077864 | 9/2004 |

OTHER PUBLICATIONS

Leoleis, G. et al.: "Mobility management for multicast sessions in a UMTS-IP converged environment," Ninth International Symposium on Computers and Communications, Jun. 1-Jul. 2004.

IEEE 802.163-04/07rd Part 16: Air interface for fixed and mobile broadband wireless access systems. Dec. 9, 2003.

Rose, C., "Minimization of Paging and Registration Costs Through Registration Deadlines," 1995 IEEE International Conference on Communications, vol. 2, pp. 735-39, Jun. 18, 1995.

Na, Jee-Hyeon, et al.,"Two Alternative Registration and Paging Schemes for Supporting Idle Mode in IEEE 802.16e Wireless MAN," 2006 IEEE 64th Vehicular Technology Conference (VTC-2006), pp. 1-5, Sep. 2006.

Yang, Shun-Ren, et al.,"Performance Evaluation of Location Management in UMTS," IEEE Transactions on Vehicular Technology, vol. 52, Issue 6, pp. 1603-1615, Nov. 2003.

* cited by examiner

METHOD OF COMMUNICATING DATA IN A WIRELESS MOBILE COMMUNICATION SYSTEM

CROSS-REFERENCE TO RELATED APPLICATIONS

This application is a continuation of U.S. application Ser. No. 11/165,662, filed on Jun. 24, 2005, now U.S. Pat. No. 7,778,640, which claims the benefit of earlier filing date and right of priority to Korean Application No. 10-2004-048423, filed on Jun. 25, 2004, Korean Application No. 10-2004-048618, filed on Jun. 26, 2004, Korean Application No. 10-2004-053151, filed on Jul. 8, 2004, Korean Application No. 10-2004-062984, filed on Aug. 2, 2004, Korean Application No. 10-2004-063248, filed on Aug. 11, 2004, and Korean Application No. 10-2005-005201, filed on Jan. 20, 2005, the contents of all of which are hereby incorporated by reference herein in their entireties.

BACKGROUND OF THE INVENTION

1. Field of the Invention

The present invention relates to a method of transmitting and receiving data, and more particularly, to a method of communicating data in a wireless mobile communication system.

2. Discussion of the Related Art

In a broadband wireless access system, a mobile subscriber station (MSS) is permitted to enter idle-mode to save power. The MSS in idle-mode does not need to perform handover procedure when moving between base stations of a same paging zone. Normally, performing handover requires the MSS to transmit in the uplink direction during idle-mode. As a result of the MSS not having to transmit to the base station (BS), power can be saved.

A MSS is located in a paging group, comprised of a plurality of base stations. The coverage area which is covered by the paging group called a paging zone. The base stations of the paging group in the paging zone share the same paging cycle and paging offset values.

The MSS transmits a request message to the BS requesting to enter idle-mode. The BS then sends a response message granting the MSS to enter idle-mode. In the response message, the BS includes paging group identification, paging cycle value, and paging offset value. The request can be made using a de-registration request (DREG-REQ) message.

In response to the request, the BS provides a response message to grant the MSS to enter idle-mode. The response message includes paging group identification, paging cycle, and paging offset of the BS. The response can be made using a de-registration command (DREG-CMD) message.

In addition, the BS provides a medium access control (MAC) address of the MSS entering idle-mode to other BSs of the paging group so that the MSS can receive paging messages during idle-mode.

During idle-mode, the BS broadcasts at specified time intervals (also referred to paging cycle) a message, inquiring whether the MSS wishes to remain in or terminate idle-mode or whether the MSS has to perform ranging operation. At the same time, the BS can transmit a paging message to notify the MSS that there is downlink data for the MSS.

Idle-mode can be terminated by either the MSS or the BS. If the MSS has to transmit data in the uplink direction, the MSS can terminate idle-mode anytime. On the other hand, if there is downlink traffic from the BS, the BS notifies the MSS to terminate idle-mode via a paging message so that the MSS can receive data. Furthermore, if the MSS in idle-mode fails to receive the paging message from the BS at specified time slot(s) or paging cycles for various reasons, such as moving to another paging zone, the MSS terminates idle-mode.

Here, the MSS in idle-mode can freely roam within the boundary of the paging zone without having to perform handover so long as the MSS does not have to receive any downlink traffic and/or transmit data in the uplink direction.

The MSS terminates idle-mode and re-registers/re-enters to the network and received downlink data if it is notified via a paging message that downlink traffic exists from the BS. In addition, as part of performing ranging operation, the MSS has the BS update the location of the MSS and an effective MSS information list. On the other hand, if the MSS receives a command via a paging message not to perform any operation, the MSS remains in idle-mode.

However, if the MSS has to transmit data in the uplink direction or if the MSS moves to a different paging zone, the BS in the paging group notifies other BSs in the paging group that the MSS is no longer in the same paging zone, thereby deleting the corresponding MSS from the list of MSSs in idle-mode.

If the MSS moves to another paging zone or need to transmit to the BS arises during idle-mode, the corresponding MSS terminates idle-mode and has to register with the new BS of the new paging group. In registering with the new BS, the MSS has to go through the registration process from the beginning the same registration process as the initial registration process to the previous network. Therefore, the MSS expands much power to register with the new network, and at the same time, much time is spent to go through the registration process.

In addition, if the MSS wishes to retain the idle-mode information of the previous paging group after moving to a new paging group, the MSS has to request idle-mode via a MAC control message after registering with the new network. Thereafter, the BS of the new paging group provides a response to the idle-mode request. Again, such procedure causes increase in MAC signaling, thereby increasing use of power.

FIG. 1 illustrates the MSS terminating idle-mode and returning to normal mode to receive downlink traffic. Here, the MSS entered idle-mode per a request made by the MSS to enter idle-mode. In addition, even if the MSS entered idle-mode per a command from the BS, the MSS terminates idle-mode and returns to normal mode to receive downlink traffic.

Referring to FIG. 1, the MSS de-registers with a BS (BS1-host BS) via the DREG-REQ and DREG-CMD (S10). After the MSS enters idle-mode, the host BS notifies other BSs in the same paging group via paging announcement that the MSS has entered idle-mode (S11). In the paging announcement, the host BS includes, a medium access control (MAC) address of the MSS. Each BS receiving the paging announcement registers the MAC address of the MSS in its paging list. This paging list is shared by all the BSs in the paging zone.

While in idle-mode, data could be sent to the MSS. In order to receive this data, the MSS must exit idle-mode. Hence, when downlink traffic exists, the host BS transmits a paging announcement to notify all the BSs in the paging group that data has to be delivered to the MSS (S12). Accordingly, each BS transmits a paging message to the MSS using the MAC address provided from the host BS during paging intervals (S13).

The MSS receives the paging message from each BSs of the paging group. If an Action Code received from one of the BSs, i.e., BS#3, is set to "10," which indicates initial network entry, the MSS performs ranging operation and initial network entry procedures with BS#3 (S14 and S15). Here, the ranging operation includes a ranging request (RNG-REQ) message from the MSS and a ranging response (RNG-RSP) message from the BS. After the MSS gains initial network entry, BS#3 transmits the downlink data to the MSS (S16).

Saving power is not limited to idle-mode. As another means of saving power besides idle-mode, the MSS can enter sleep mode to save power. For the MSS to enter sleep mode, the MSS transmits a request to enter sleep mode via a sleep request (MOB-SLP-REQ) message to the BS. The BS then sends a response message granting the MSS to enter sleep mode via a sleep response (MOB-SLP-RSP) message. The MOB-SLP-REQ and MOB-SLP-RSP messages includes various information such as the starting time of sleep mode, maximum/minimum sleeping interval (in frames), and listening interval(s).

At the end of the sleeping interval, the BS transmits a traffic indication (MOB-TRF-IND) message to notify the MSS of whether any downlink traffic exists. If there is no downlink traffic for the MSS to receive, the MSS can return to sleep mode. If, however, there is downlink data, the MSS returns to normal mode to receive downlink data.

FIG. 2 illustrates the MSS terminating sleep mode and returning to normal mode to receive downlink traffic. Here, the MSS entered sleep mode per a request made by the MSS to enter sleep mode. In addition, even if the MSS entered idle-mode per a command from the BS, the MSS terminates idle-mode and returns to normal mode to receive downlink traffic.

Referring to FIG. 2, the MSS transmits a request to enter sleep mode via the MOB-SLP-REQ message to the BS (S2-0). In response, the BS transmits the MOB-SLP-RSP message to the MSS (S2-1). In the MOB-SLP-RSP message, information such as the starting time of sleep mode (M), maximum/minimum sleeping interval (N1, N2), and listening interval (L1) are included.

The MSS enters sleep mode according to the minimum sleeping interval (N1) set in S20 and S21, and the BS transmits the MOB-TRF-IND message during the listening interval L1 (S2-2). It is through the MOB-TRF-IND message that the BS indicates the MSS whether there is any data to receive for the MSS (negative/positive). In addition, the MSS listens or wakes up from sleeping during L1 to check whether any downlink data exists. If there is no downlink data, which is indicated by 'negative indication,' the MSS returns to sleep mode. However, after a listening interval, the sleeping interval or sleeping window size is doubled according to a scheduled sleep window setting method.

If the BS receives data to transmit to the MSS during the sleeping interval, the BS stores the data in a specified storage space and waits until the next listening interval, at which time the MSS is notified of the data via the MOB-TRF-IND message (S2-3). Thereafter, the MSS wakes up from sleep mode and returns to normal mode in order to receive data (S2-4).

In normal mode, if an internet protocol (IP) packet (data) is received by the MSS, a router transmits the IP packet to the MSS via a base station. In version 4 of IP (IPv4), the router uses an ARP, and in version 6 of IP (IPv6), the router uses neighbor discovery (ND). In other words, when transmitting the IP packet to the MSS, the router uses the ARP and ND protocols to find out a target link-layer address (e.g., MAC address or Ethernet address) corresponding to the IP address of the MSS. The ARP is IPv4 protocol which is used when changing the IP address to the link-layer address, such as the MAC address or Ethernet address.

Furthermore, the ND protocol is IPv6 address used to determine the link-layer addresses of neighboring links. The changing of address occurs at the time when the IP packet header and the link-layer address header are generated. As such, the address change occurs only in the outputted IP packet.

Traditionally, it is not clearly specified as to how the BS transmits or broadcasts the request or neighboring solicitation to the MSS. More specifically, the specific role or operation by the BS has not been clearly defined in transmitting the request/neighboring solicitation to the MSS during normal mode.

Furthermore, the MSS in either sleep mode or idle-mode only receives signal at specified intervals/cycles. As a result, if the router has to transmit a received data to the MSS, a problem arises when the MSS is in sleep mode or idle-mode since the MSS cannot respond to the ARP request or neighboring solicitation until the scheduled time. Consequently, the target MSS cannot send a response, resulting in delivery failure. Based on the problem, it is possible that the MSS does not receive the data.

As discussed above, the problem exists in delivering data to the MSS from the router. Especially since in power saving sleep-mode or idle-mode of the MSS, the data received at the router cannot be received by the MSS since the MSS cannot receive until specified times. Therefore, the data is not always transmitted to the MSS.

SUMMARY OF THE INVENTION

Accordingly, the present invention is directed to a method of communicating data in a wireless broadband communication system that substantially obviates one or more problems due to limitations and disadvantages of the related art.

An object of the present invention is to provide a method of communicating data between the MSS and a network entity to enter idle-mode, update location during idle-mode, and re-enter network after idle-mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of communicating data for entering idle-mode includes the MSS transmitting a request by a mobile subscriber station (MSS) to a network entity via a de-registration request message requesting the network entity to retain a preferred session information, and receiving a selected session information via a de-registration command response from the network entity.

In another aspect of the present invention, a method for updating location of the MSS which includes transmitting a request to a second network entity via a ranging request message requesting a location update of the MSS from a first network entity, receiving a selected session information to be updated via a response message from the second network entity, and performing network entry procedure to update session information after the location of the MSS is updated from the first network entity to the second network entity.

In another aspect of the present invention, a method for entering network after idle-mode. More specifically, the method includes transmitting a request to a second network entity via a ranging request message, receiving a selected session information via a ranging response message from a second network entity, wherein the selected session information is received by the second network entity from a first network entity, and entering a network of the second network entity.

In another aspect of the present invention, a method requesting a network entity to retain network address of the MSS is introduced. The process includes transmitting to a first network entity a request to retain a network address via a request message, entering idle-mode after receiving a response message from the first network entity, receiving a paging message from a second network entity during idle-mode, entering a network of the second network entity, and receiving an Internet protocol (IP) packet from the second network entity.

In another aspect of the present invention, a method requesting a network entity to retain convergence sublayer information is introduced. The process includes transmitting via a request message a request to a first network entity to retain a convergence sublayer (CS) information, entering idle-mode after receiving a response message from the first network entity, receiving a paging message from a second network entity during idle-mode, entering network of the second network, and receiving a data packet from the second network entity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
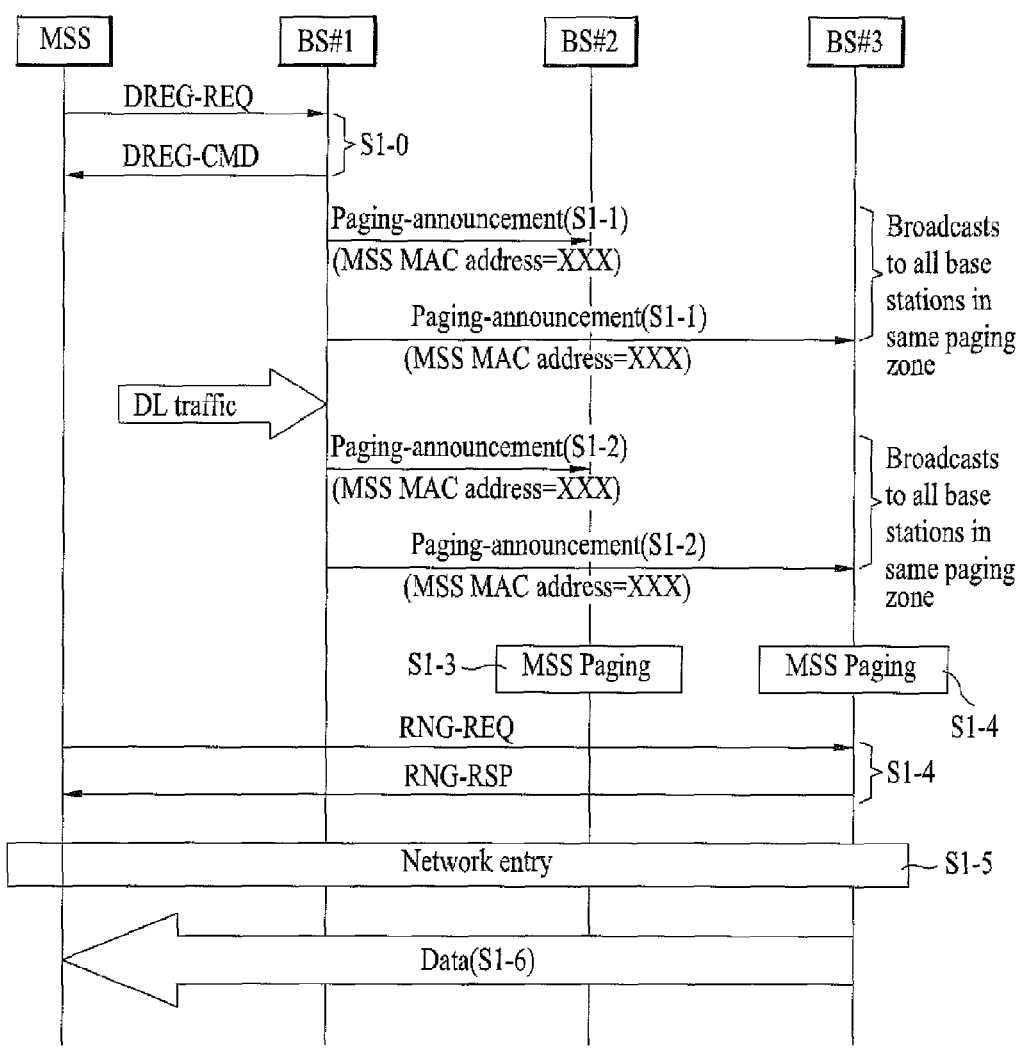
FIG. 1 illustrates a mobile subscriber station (MSS) terminating idle-mode and returning to normal mode to receive downlink traffic.
Figure 2:
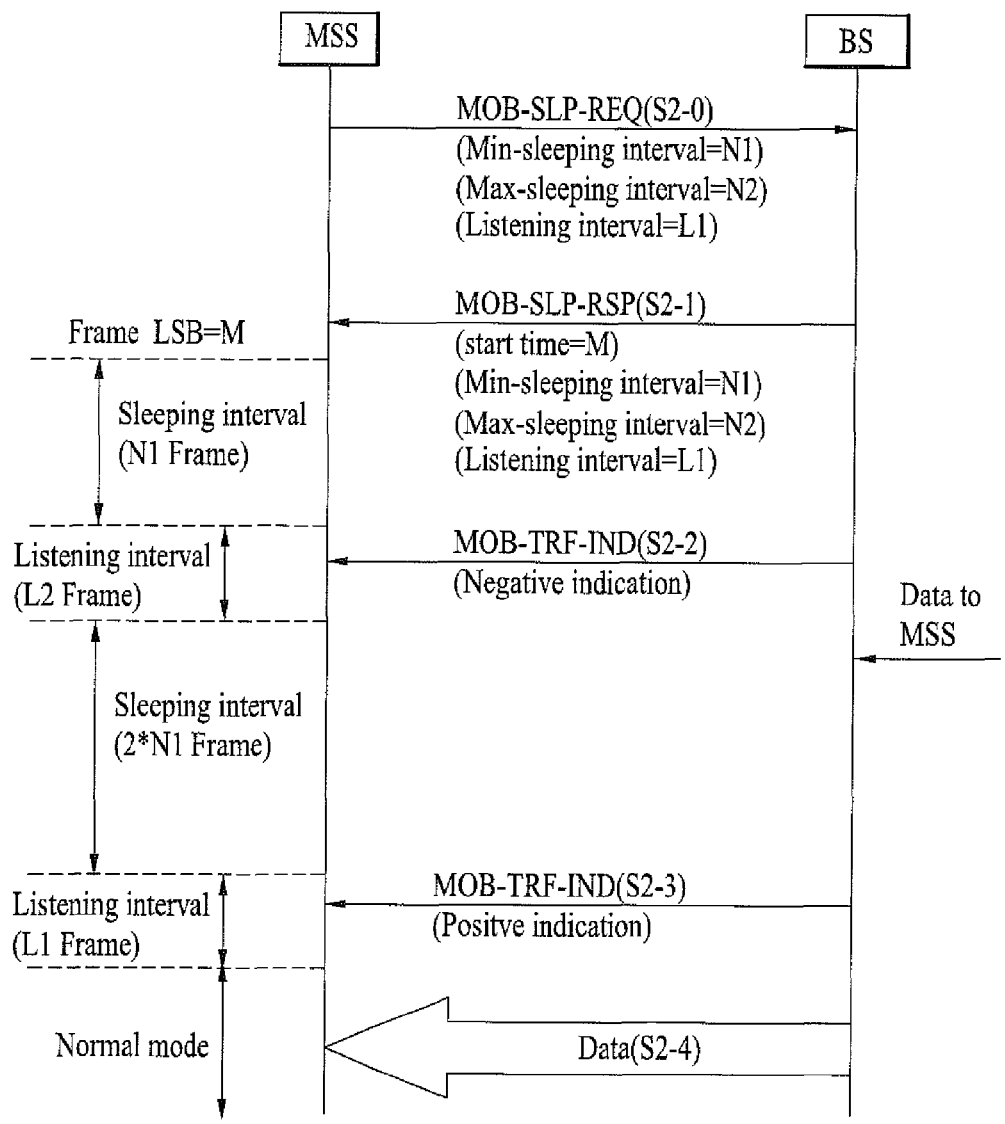
FIG. 2 illustrates the MSS terminating sleep mode and returning to normal mode to receive downlink traffic.

Reference will now be made in detail to the preferred embodiments of the present invention, examples of which are illustrated in the accompanying drawings. Wherever possible, the same reference numbers will be used throughout the drawings to refer to the same or like parts.

When entering idle-mode, the MSS transmits to a network entity session information of the MSS via a request message. The network entity can be a base station, paging controller, access gateway, or base station controller, for example. The session information is a list of session information of the MSS which the MSS prefers that the network entity retain. Particularly, a MSS preferred session information relates to network re-entry related services and operational information to expedite future network re-entry from idle-mode.

In addition, the request message includes a request by the MSS to enter idle-mode. For example, the request message is a de-registration request (DREG-REQ) message. Furthermore, the request message includes the preferred session information which the MSS desires the network entity retain. More specifically, the session information includes information such as security information, internet protocol (IP) address information, the MSS capability, management connection identification, and information essential to maintaining network service.

After receiving the preferred session information (or session information list), the network entity selects session information which it decides to retain. Thereafter, the network entity notifies the MSS via a response message of the network entity selected session information. The selected session information can be same, different, or combination thereof from the preferred session information transmitted from the MSS. Again, the selected session information comprises a list of network entity selected session information to expedite a future MSS re-entry from idle-mode by retaining certain MSS service and operational information. Furthermore, the selected session information is used to ensure effective and efficient service flow between the MSS and the network entity.

In addition, the response message includes a response to the request by the MSS to enter idle-mode. For example, the request message is a de-registration command (DREG-CMD) message. In the response message, the network entity includes the selected session information.

During idle-mode, if there is downlink traffic to the MSS, the network entity transmits a paging message, and included in the paging message is the selected session information, to the MSS receiving the downlink data. Usually, the paging message can be transmitted periodically or at specified time intervals. Thereafter, the network entities in the same paging group share with each other the selected session information via a backbone network. As a result, when the MSS terminates idle-mode and re-enters the network, the MSS can bypass some of the procedural steps required in re-entering the network. As explained earlier, retention of the selected session information by the network entity makes possible expedited re-entry. The procedural steps include, for example, those steps than can be shared concurrently with other network entities such as the IP address and/or security information.

In the event the MSS moves to another paging group and requires a location update, a new network entity in another paging group receives the selected session information from the network entity of the previous paging group. The network entity of the previous paging group is the network entity which retained the latest updated MSS session information. The new network entity of another paging group then transmits the selected session information received from the previous paging group to the MSS. Subsequently, in updating the location of the MSS, the MSS re-enters the new network in order to update information. In short, the location update of the MSS can take place in paging zone identification based environment where the updating occurs when the MSS moves from one paging zone identification to another paging zone identification, for example.

In addition, location update of the MSS can take place based on time. In other words, timer-based location update includes a schedule whereby the MSS and network conducts location update. For example, if a timer-based location update schedule is set at every 10 seconds between the MSS and the network entity, location of the MSS is updated every 10 seconds based on previous location update regardless whether the MSS have moved or not.

When the MSS receives a plurality of paging group identifications via the paging message, the MSS requests for a location update to the corresponding network entity. In updating the location, the MSS transmits to the network entity the identification of the network entity which granted idle-mode entry in the previous paging group and the paging group identification of the paging group which wishes to permit the MSS to remain in idle-mode. Thereafter, the corresponding network entity transmits information, such as the paging group identification, the paging cycle value, and the paging offset value, via the response message to the location update request, to permit the MSS to remain in idle-mode after moving to a different paging group.

The following Table 1 shows an example of message parameter of the session information list of the MSS.

TABLE 1

| Name | Type | Length | Value |
|---|---|---|---|
| Expedited Network Setup | nn | 1 | For each Bit location, a value of '0' indicates the associated re-entry management messages are not wished to be kept, a value of '1' indicated the re-entry management messages are wished to be kept.<br>Bit #0: SBC-REQ/RSP management related profiles<br>Bit #1: PKM-REQ/RSP management related profiles<br>Bit #2: REG-REQ/RSP management related profiles<br>Bit #3: Network Address Information related profiles<br>Bit #4: Network Service related profiles<br>Bit #5~6: reserved |

The message parameter of Table 1 is included in the message in the TLV format, and the network registration procedure that can be bypassed when terminating idle-mode can be expressed in a bit map format. In the embodiments of the present invention, such operation is indicated as "Expedited network setup_flag."

Figure 3:
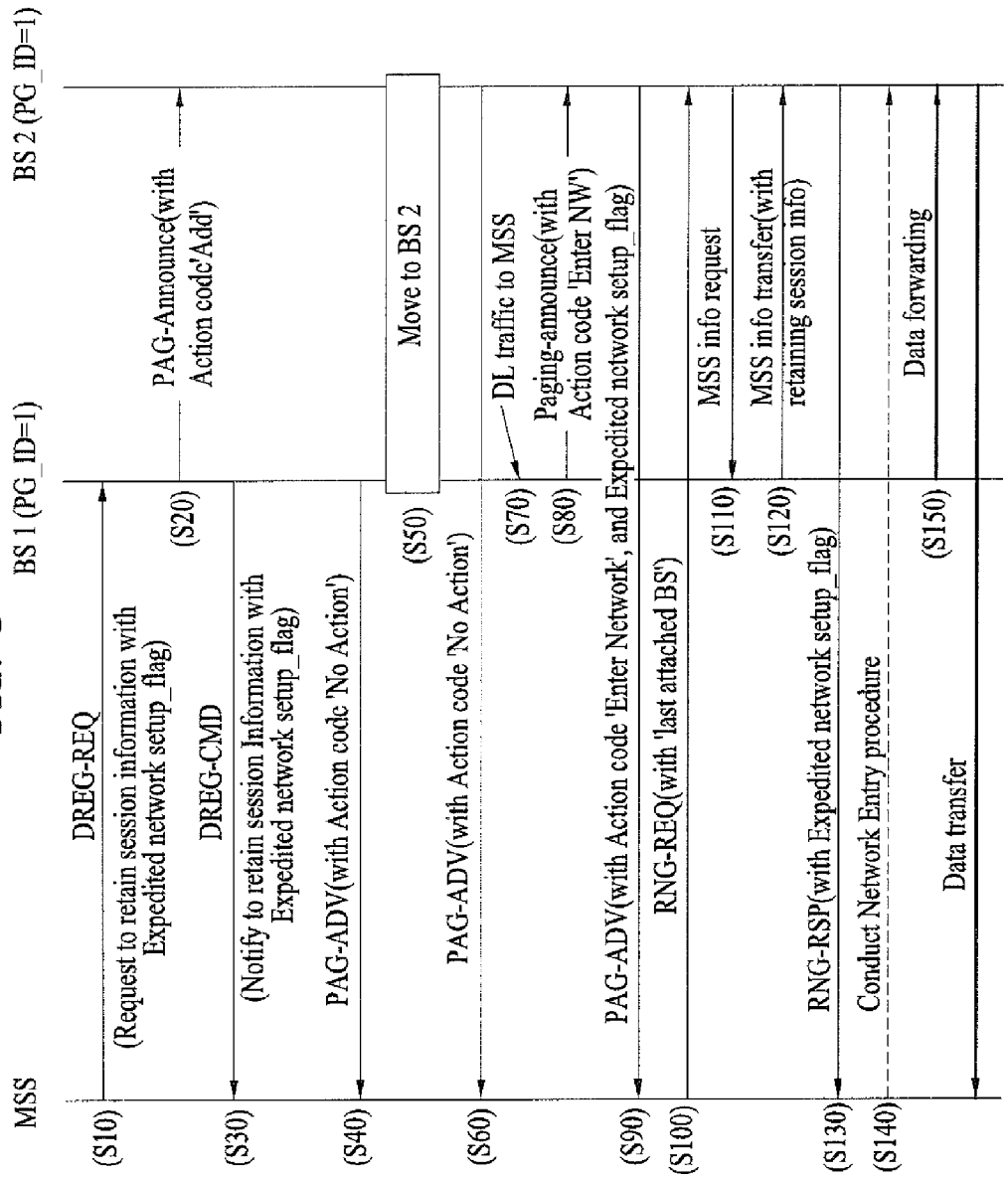
FIG. 3 illustrates a signaling process when MSS bound downlink traffic arises during idle-mode.

FIG. 3 illustrates an embodiment of the present invention with respect to a signaling process when MSS bound downlink traffic arises during idle-mode. The FIG. 3 shows the procedures for the MSS to terminate idle-mode when downlink traffic exists.

The MSS transmits to a first network entity a request message to request to enter idle-mode via a de-registration request (DREG-REQ) message (S10). Included in the request message is a MSS preferred session information which the MSS prefers that the network entity retain for expedited future re-entry to a network. As explained above, the network entity can be a base station, paging controller, access gateway, or a base station controller, for example. This MSS preferred session information includes information such as security information, internet protocol (IP) address information, the MSS capability, management connection identification, and information essential to maintaining network service. The preferred session information message can be in a format similar to that of Table 1.

For the sake of explaining, the network entity, which received the preferred session information from the MSS, is identified as a first network entity. Also, a second network entity can be identified as a network entity which the MSS seeks to re-enter from idle-mode. After receiving the request message, the first network entity broadcasts via backbone channel(s) a notification to at least one or all other network entities having the same paging identifications in the paging group so that the corresponding MSS can be added to each network entity in the paging group (S20). Thereafter, in response to the request message, the first network entity transmits a selected session information to the corresponding MSS via a de-registration response command (DREG-CMD) (S30). The selected session information includes certain MSS service and operational information useful for expediting a future MSS network re-entry from idle-mode. The selected session information can be a list of selected session information which can be same, different, or combination thereof as the preferred session information requested by the MSS. Moreover, in the transmission of the DREQ-CMD, other information such as paging cycle, paging offset, and paging identification can be included. The DREG-CMD is a command or a message granting the MSS to enter idle-mode as requested.

Upon receipt of the DREG-CMD from the first network entity, the MSS enters idle-mode. During idle-mode, the MSS can receive a paging message(s) at specified time slots or intervals from the first network entity (S40). The paging message includes various information such as whether there is any downlink traffic or when to terminate idle-mode.

During idle-mode, it is possible for the MSS to move to another network entity (hereinafter "second network entity") in a paging group having same paging group identifications or in a paging group having a plurality of paging group identifications. If the MSS moves to the second network entity within the same paging group which has the same paging identification (S50), the MSS receives paging message(s) from the second network entity at same paging cycle and paging offset as received from the first network entity (S60).

When downlink traffic arrives to the first network entity, and the first network entity is notified of downlink traffic to the MSS (S70), the first network entity transmits the session information along with existence of downlink traffic via a backbone network to other network entities in the paging group (S80).

After receiving the selected session information from the first network entity, the second network entity transmits a paging message, including the selected session information and existence of downlink traffic, to the MSS (S90). The MSS then transmits the identification of the first network entity, which granted the MSS to enter idle-mode, to the second network entity via a ranging request message (S100).

Upon receipt of the identity of the first network entity, the second network entity notifies the first network entity that the MSS is located in its coverage area and requests the first entity to transmit the session information of the corresponding MSS retained by the first network entity (S110).

The first network entity complies with the request by transmitting the retained session information via the backbone channels (S120). Furthermore, the second network entity transmits to the MSS the list of session information currently retained by the second network entity via a ranging response message (S130). As a result, when the MSS performs re-entry to the network, certain procedural steps required for re-entry to the network can be skipped. In other words, because the second network entity retains certain MSS service and operational information, the same information is not required in re-entry to the network. At the same time, the MSS receives via the ranging response message the procedural steps that can be skipped by the MSS in re-entering the network.

Based on the information provided from the second network entity, network entry or re-entry procedure takes place (S140). The procedural steps of the network registration can include, for example, the negotiation procedure of the MSS capability, security procedure, registration procedure, IP address acquisition procedure, to name a few. In addition, in order to establish connection for data reception, the MSS carries out the necessary procedures in conjunction with the network entry procedures. After procedures for network entry (or re-entry) and data reception are completed, the second network entity transmits the downlink data received from the first network to the MSS (S150).

The steps (S10-S150) describe the operation in the network when downlink traffic exists during idle-mode. If uplink traffic occurs to the MSS in idle-mode, certain steps (S70, S80, S90, and S150) can be excluded from operation.

Figure 4:
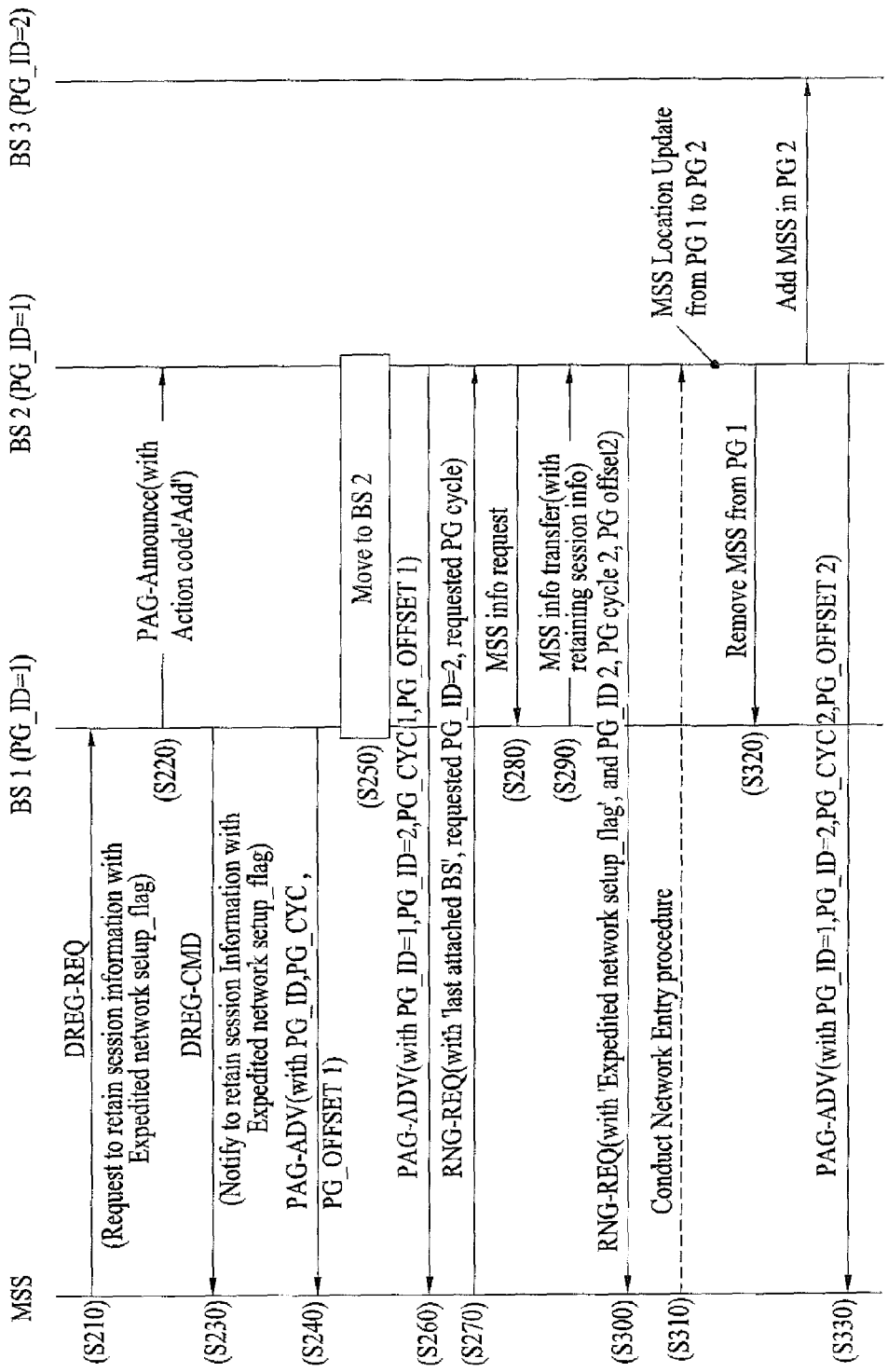
FIG. 4 illustrates a signaling process when the MSS requests to enter idle-mode and requests the network entity to retain session information.

FIG. 4 illustrates a signaling process when the MSS requests to enter idle-mode and requests the network entity to retain session information. As another embodiment of the present invention, the processes involved in updating the location of the MSS in idle-mode after the MSS moves to another paging group is described.

Referring to FIG. 4, the MSS transmits a request message to request to a first network entity to enter idle-mode via a de-registration request (DREG-REQ) message (S210). Included in the request message is a MSS preferred session information which the MSS prefers that the network entity retain for expedited future re-entry to a network. The network entity can be a BS or a paging controller. As explained above, the network entity can be a base station, paging controller, access gateway, or a base station controller, for example. This MSS preferred session information includes information such as security information, interne protocol (IP) address information, the MSS capability, management connection identification, and information essential to maintaining network service. The preferred session information message can be in a format similar to that of Table 1.

As explained above, the identities of a first network entity and a second network entity are described with respect to FIG. 3. After receiving the request message, the first network entity broadcasts via a backbone channel a notification to all other network entities having the same paging identifications in the paging group so that the corresponding MSS can be added to each network entity in the paging group (S220). Thereafter, in response to the request message, the first network entity transmits a selected session information to the corresponding MSS via a de-registration response command (DREG-CMD) (S230). The selected session information includes certain MSS service and operational information useful for expediting a future MSS network re-entry from idle-mode. The selected session information can be a list of selected session information which can be same, different, or combination thereof as the preferred session information requested by the MSS. Moreover, in the transmission of the DREQ-CMD, other information such as paging cycle, paging offset, and paging identification can be included. The DREG-CMD is a command or a message granting the MSS to enter idle-mode as requested.

Upon receipt of the DREG-CMD from the first network entity, the MSS enters idle-mode. During idle-mode, the MSS can receive a paging message(s) at specified time slots or intervals from the first network entity (S240). The paging message includes various information such as whether there is any downlink traffic or when to terminate idle-mode.

During idle-mode, it is possible for the MSS to move to another network entity (hereinafter "second network entity") in a paging group having same paging group identifications or in a paging group having a plurality of paging group identifications. If the MSS moves to the second network entity within the same paging group which has the same paging identification (S250), the MSS receives paging message(s) from the second network entity at same paging cycle and paging offset as received from the first network entity (S260).

If the cell coverage area is designed so that a network entity can only belong one paging group, a network entity moving to a paging group having more than one paging group identifications refers to the network entity in transit between two paging groups, for example.

It is at this point the MSS learns that second network entity also belongs to a second paging group which has different paging group identification than that of the first paging group. The second network entity transmits a paging group identification corresponding to the paging group to which it belongs via a paging message. If the cell coverage area is designed so that a network entity can belong only to one paging group, it is possible to transmit a paging group identification of a neighboring paging group, for example.

After receiving a paging message having different paging group identification, the MSS requests for location update from the second network entity via a ranging request message (S270). In addition to location update request, the ranging request message can include other information such as the identification of the first network entity, which granted the MSS to enter idle-mode, the paging group identification of a second paging group, and a desired paging cycle. If the cell coverage area is designed so that a network entity can belong only to one paging group, the MSS cannot receive the paging message via previous paging information when the MSS moves to another paging group, so it is at this point the MSS requests for location update to a new network entity, for example.

The second network entity, after receiving a location update request from the MSS, makes a request to the first network entity to transmit the selected session information currently retained by the first network entity (S280). The first network entity then transmits the currently retained selected session information to the second network entity per request (S290).

Even after the location of the MSS has been updated, the second network entity transmits the list of retained session information of the MSS via a ranging response message (S300). Here in the ranging response message, other information such as a second paging group identification and corresponding paging cycle and paging offset values. As a result, the corresponding MSS is able to receive the paging message according to the second paging group identification.

Furthermore, the second network entity transmits to the MSS the session information currently retained by the second network entity via a ranging response message. As a result, when the MSS performs re-entry to the network, certain procedural steps required for re-entry to the network can be skipped. In other words, because the second network entity retains certain MSS service and operational information, the same information is not required in re-entry to the network. At the same time, the MSS receives via the ranging response message the procedural steps that can be skipped by the MSS in re-entering the network.

After receiving the retained session information from the first network entity via the ranging response message, the MSS can execute necessary network entry procedure(s) in order to update no longer effective or outdated information (S310). The second network entity uses a backbone network to notify the other network entities of the first paging group that the MSS has relocated to a different paging group and to de-register and delete information related to the MSS (S320). At the same time, the second network entity notifies the network entities of the second paging group to add information related to the MSS via the backbone network. As for the MSS, the MSS receives paging messages at specified intervals from the second paging group and maintains idle-mode (S330).

As described above, if the location of the MSS is updated from a first network entity to a second network entity, downlink data directed to the MSS is received by the second network entity, which has updated the location of the MSS, and not the first network entity.

Figure 5:
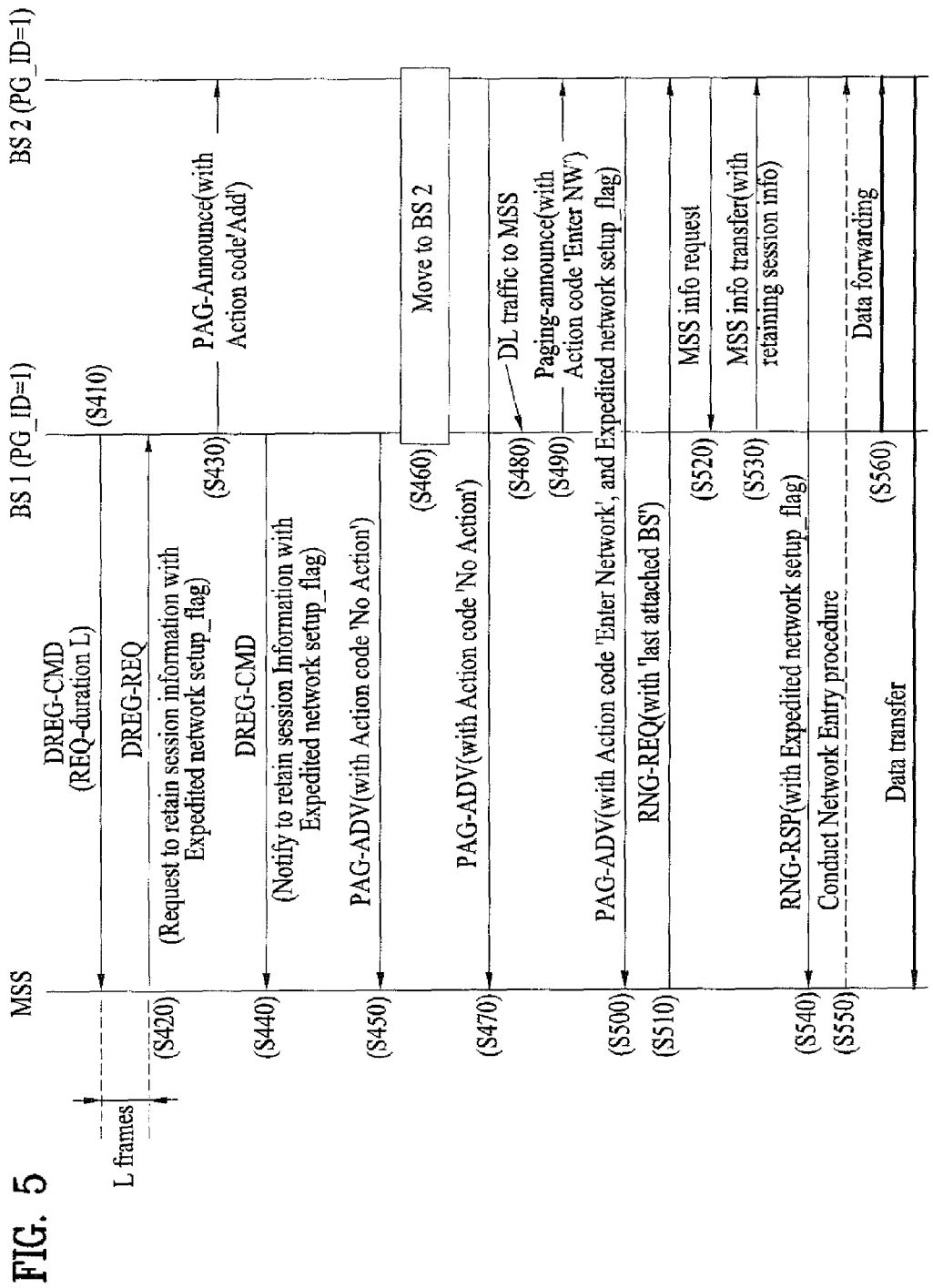
FIG. 5 illustrates a signaling process when the network entity commands the MSS to enter idle-mode, and the MSS requests the network entity to retain session information.

FIG. 5 illustrates a signaling process of another embodiment of the present invention. Here, downlink traffic exists in an environment where a MSS enters idle-mode as a result of a command by a network entity to the MSS to enter idle-mode via a de-registration command (DREG-CMD) message.

In this embodiment, the network entity commands the MSS to enter idle-mode unlike the previous embodiments where the MSS transmitted a request to the network entity to enter idle-mode. Here, the command to enter idle-mode is transmitted via the DREG-CMD message. The DREG-CMD includes an action code set at 0x05 and a required duration (REQ-duration) which specifies time for the MSS to enter idle-mode (S410).

More specifically, a first network entity requests the MSS to transmit a MSS preferred session information via the DREG-CMD message. The DREG-REQ includes a specified time by or at which the MSS transmits the requested message. After the receiving the DREG-CMD from the first network entity, the MSS transmits the network entity the requested MSS preferred session information at the specified time to the first network via a de-registration request (DREG-REQ) message (S420). The MSS preferred session information includes information such as security information, internet protocol (IP) address information, the MSS capability, management connection identification, and information essential to maintaining network service. The MSS preferred session information is a list of session information which the MSS prefers that the network entity retain for expedited future re-entry to a network.

As explained above, the identities of a first network entity and a second network entity are described above with respect to FIG. 3. After receiving the request message, the first network entity broadcasts via backbone channel(s) a notification to all other network entities having the same paging identifications in the paging group so that the corresponding MSS can be added to each network entity in the paging group (S430). Thereafter, in response to the request message, the first network entity transmits a selected session information to the corresponding MSS via a de-registration response command (DREG-CMD) (S440). The selected session information includes certain MSS service and operational information useful for expediting a future MSS network re-entry from idle-mode. The selected session information can be a list of selected session information which can be same, different; or combination thereof as the preferred session information requested by the MSS. Moreover, in the transmission of the DREQ-CMD, other information such as paging cycle, paging offset, and paging identification can be included. The DREG-CMD is a command or a message granting the MSS to enter idle-mode as requested.

Upon receipt of the DREG-CMD from the second network entity, the MSS enters idle-mode. During idle-mode, the MSS can receive a paging message(s) at specified time slots or intervals from the first network entity (S450). The paging message includes various information such as whether there is any downlink traffic or when to terminate idle-mode.

During idle-mode, it is possible for the MSS to move to another network entity (hereinafter "second network entity") in a paging group having same paging group identifications or in a paging group having a plurality of paging group identifications. If the MSS moves to the second network entity within the same paging group which has the same paging identification (S460); the MSS receives paging message(s) from the second network entity at same paging cycle and paging offset as received from the first network entity (S470).

When downlink traffic arrives to the first network entity, and the first network entity is notified of downlink traffic to the MSS (S480), the first network entity transmits the session information along with existence of downlink traffic via a backbone network to other network entities in the paging group (S490). Here, the selected session information transmitted to other network entities in the paging group via the backbone channels can be a list of selected session information.

After receiving the selected session information from the first network entity, the second network entity transmits a paging message, including the selected session information and existence of downlink traffic, to the MSS (S500). The MSS then transmits the identification of the first network entity, which granted the MSS to enter idle-mode, to the second network entity via a ranging request message (S510).

Upon receipt of the identity of the first network entity, the second network entity notifies the first network entity that the MSS is located in its coverage area and requests the first entity to transmit the session information of the corresponding MSS retained by the first network entity (S520).

The first network entity complies with the request by transmitting the retained session information via the backbone channels (S530). Furthermore, the second network entity transmits to the MSS the list of session information currently retained by the second network entity via a ranging response message (S540). As a result, when the MSS performs re-entry to the network, certain procedural steps required for re-entry to the network can be skipped. In other words, because the second network entity retains certain MSS service and operational information, the same information is not required in re-entry to the network. At the same time, the MSS receives via the ranging response message the procedural steps that can be skipped by the MSS in re-entering the network.

Based on the information provided from the second network entity, network entry or re-entry procedure takes place (S550). The procedural steps of the network registration can include, for example, the negotiation procedure of the MSS capability, security procedure, registration procedure, IP address acquisition procedure, to name a few. In addition, in order to establish connection for data reception, the MSS carries out the necessary procedures in conjunction with the network entry procedures. After procedures for network entry (or re-entry) and data reception are completed, the second network entity transmits the downlink data received from the first network to the MSS (S560).

The steps (S410-S560) describe the operation in the network when downlink traffic exists during idle-mode. If uplink traffic occurs to the MSS in idle-mode, certain steps (S480, S490, S500, and S560) can be excluded from operation.

Figure 6:
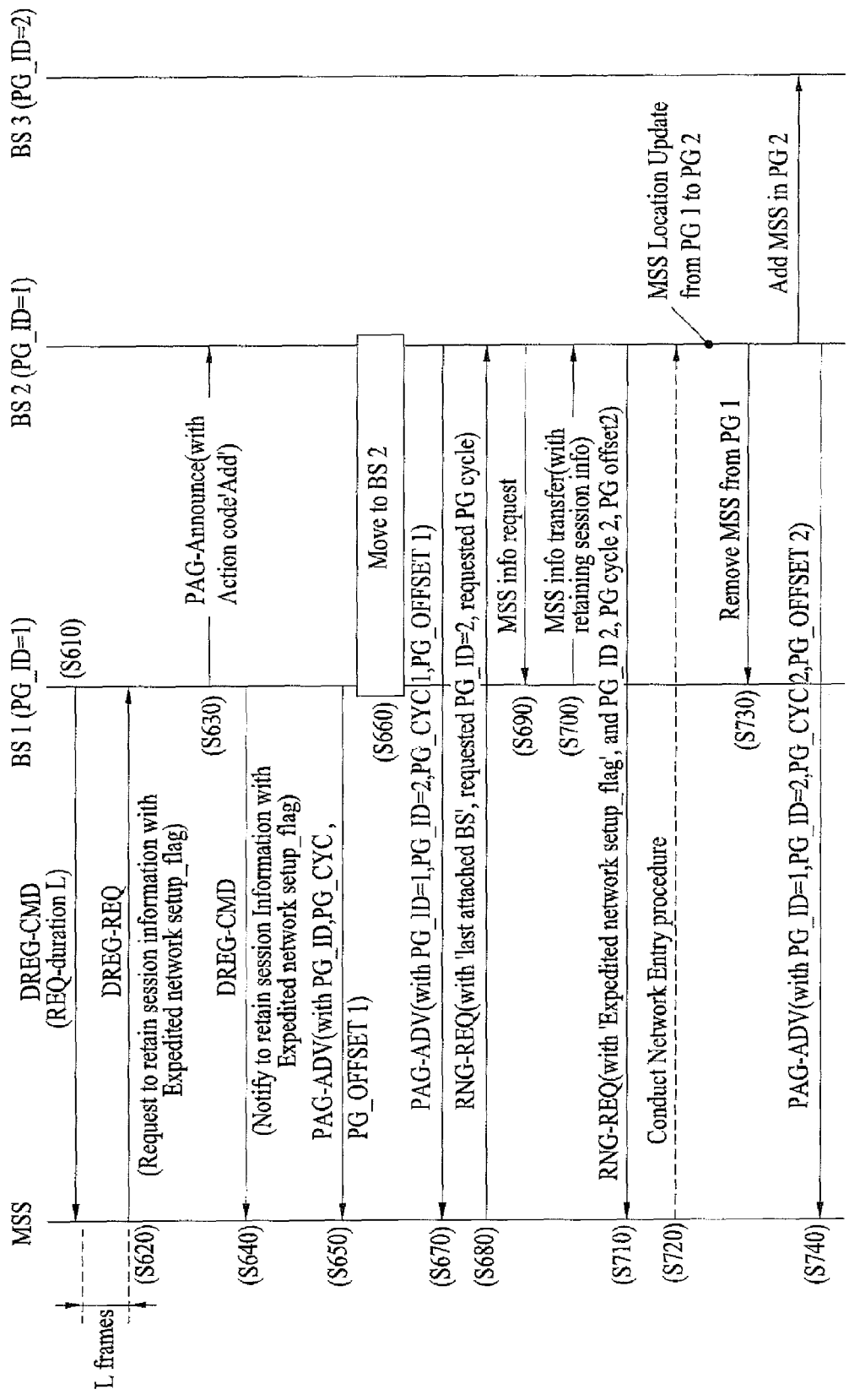
FIG. 6 illustrates a signaling process of location update by the MSS from one paging group to another paging group.

FIG. 6 illustrates a signaling process of another embodiment of the present invention. Here, downlink traffic exists in an environment where a MSS enters idle-mode as a result of a command by a network entity to the MSS to enter idle-mode via a de-registration command (DREG-CMD) message. In addition, this embodiment describes the processes involved in updating the location of the MSS in idle-mode after the MSS moves to another paging group.

In this embodiment, the network entity commands the MSS to enter idle-mode unlike the previous embodiments where the MSS transmitted a request to the network entity to enter idle-mode. Here, the command to enter idle-mode is transmitted via the DREG-CMD message. The DREG-CMD includes an action code set at 0x05 and a required duration (REQ-duration) which specifies time for the MSS to enter idle-mode (S610).

More specifically, a first network entity requests the MSS to transmit a MSS preferred session information via the DREG-CMD message. The DREG-REQ includes a specified time by or at which the MSS transmits the requested message. After the receiving the DREG-CMD from the first network entity, the MSS transmits the network entity the requested MSS preferred session information at the specified time to the first network via a de-registration request (DREG-REQ) message (S620). The MSS preferred session information includes information such as security information, internet protocol (IP) address information, the MSS capability, management connection identification, and information essential to maintaining network service. The MSS preferred session information is a list of session information which the MSS prefers that the network entity retain for expedited future re-entry to a network.

As explained above, the identities of a first network entity and a second network entity are described above with respect to FIG. 3. After receiving the request message, the first network entity broadcasts via backbone channel(s) a notification to all other network entities having the same paging identifications in the paging group so that the corresponding MSS can be added to each network entity in the paging group (S630). Thereafter, in response to the request message, the first network entity transmits a selected session information to the corresponding MSS via a de-registration response command (DREG-CMD) (S640). The selected session information includes certain MSS service and operational information useful for expediting a future MSS network re-entry from idle-mode. The selected session information can be a list of selected session information which can be same, different, or combination thereof as the preferred session information requested by the MSS. Moreover, in the transmission of the DREQ-CMD, other information such as paging cycle, paging offset, and paging identification can be included. The DREG-CMD is a command or a message granting the MSS to enter idle-mode as requested.

Upon receipt of the DREG-CMD from the first network entity, the MSS enters idle-mode. During idle-mode, the MSS can receive a paging message(s) at specified time slots or intervals from the first network entity (S650). The paging message includes various information such as whether there is any downlink traffic or when to terminate idle-mode.

During idle-mode, it is possible for the MSS to move to another network entity (hereinafter "second network entity") in a paging group having same paging group identifications or in a paging group having a plurality of paging group identifications. If the MSS moves to the second network entity within the same paging group which has the same paging identification (S660); the MSS receives paging message(s) from the second network entity at same paging cycle and paging offset as received from the first network entity (S670).

If the cell coverage area is designed so that a network entity can only belong one paging group, a network entity moving to a paging group having more than one paging group identifications refers to the network entity in transit between two paging groups, for example.

It is at this point the MSS learns that second network entity also belongs to a second paging group which has different paging group identification than that of the first paging group. The second network entity transmits a paging group identification corresponding to the paging group to which it belongs via a paging message. If the cell coverage area is designed so that a network entity can belong only to one paging group, it is possible to transmit a paging group identification of a neighboring paging group, for example.

After receiving a paging message having different paging group identification, the MSS requests for location update from the second network entity via a ranging request message (S680). In addition to location update request, the ranging request message can include other information such as the identification of the first network entity, which granted the MSS to enter idle-mode, the paging group identification of a second paging group, and a desired paging cycle. If the cell coverage area is designed so that a network entity can belong only to one paging group, the MSS cannot receive the paging message via previous paging information when the MSS moves to another paging group, so it is at this point the MSS requests for location update to a new network entity, for example.

The second network entity, after receiving a location update request from the MSS, makes a request to the first network entity to transmit the selected session information currently retained by the first network entity (S690). The first network entity then transmits the currently retained selected session information to the second network entity per request (S700).

Even after the location of the MSS has been updated, the second network entity transmits the retained session information of the MSS via a ranging response message (S710). Here in the ranging response message, other information such as a second paging group identification and corresponding paging cycle and paging offset values. As a result, the corresponding MSS is able to receive the paging message according to the second paging group identification. Furthermore, the second network entity transmits to the MSS the session information currently retained by the second network entity via a ranging response message. As a result, when the MSS performs re-entry to the network, certain procedural steps required for re-entry to the network can be skipped. In other words, because the second network entity retains certain MSS service and operational information, the same information is not required in re-entry to the network. At the same time, the MSS receives via the ranging response message the procedural steps that can be skipped by the MSS in re-entering the network.

After receiving the retained session information from the second network entity via the ranging response message, the MSS can execute necessary network entry procedure(s) in order to update no longer effective or outdated information (S720). The second network entity uses a backbone network to notify the other network entities of the first paging group that the MSS has relocated to a different paging group and to de-register and delete information related to the MSS (S730). At the same time, the second network entity notifies the network entities of the second paging group to add information related to the MSS via the backbone network. As for the MSS, the MSS receives paging messages at specified intervals from the second paging group and maintains idle-mode (S740).

As described above, if the location of the MSS is updated from a first network entity to a second network entity, downlink data directed to the MSS is received by the second network entity, which has updated the location of the MSS, and not the first network entity.

The above discussions relate to operations/procedures of the MSS and the network entities in entering network(s) for idle-mode, including updating session information to expedite re-entry of the MSS from idle-mode. The following discusses the operations of the MSS before entering idle-mode in order to effectively receive downlink traffic during idle-mode.

During normal mode, a router uses a destination or target IP address to find out a MSS link-layer address (e.g., MAC address or Ethernet address) in order to transmit data to the MSS. To accomplish this, the router sends an address request to the network entity. Here, in version 4 of the IP (IPv4), the router transmits the ARP request, and in version 6 of the IP (IPv6), the router transmits neighboring solicitation.

In an embodiment of the present invention, after the network entity receives the address request message from the router, the network entity broadcasts to a plurality MSSs or transmits the address request message to each MSS individually. Thereafter, the network entity receives the response messages from the MSSs, such as an ARP response message or neighbor advertisement response message, and transmits the response message to the router. In the address request message, for example, the MAC address or the Ethernet address can be included. From the plurality of the MSSs who received the address request message, the MAC or Ethernet address of a MSS can match the MAC or Ethernet address included in the address request message. Then the MSS having the matching MAC address transmits a response message to the network entity via a secondary management connection or a general data burst.

Furthermore, in an embodiment of the present invention, a network entity can transmit to a router a proxy ARP response message (or proxy neighbor advertisement) of a MSS in sleep/idle-mode. In other words, the network entity can respond directly to a request by the router as an agent of the MSS, for example. For the network entity to respond to the router, the MSS includes its IP address in the MOB-SLP-REQ message or the DREG-REQ message and transmits to the network entity. In addition, the MSS provides its IP address to the network entity before entering sleep/idle-mode when entry to sleep/idle-mode is ordered by the network entity. The embodiment of the present invention is not limited to IPv4 but can apply to IPv6 using neighbor discovery protocol.

In the embodiment of the present invention, the network entity uses a proxy ARP or a proxy neighbor discovery protocol to have data transmitted to the network entity while the MSS is in sleep mode or idle-mode. As discussed earlier, the network entity can be a base station, paging controller, access gateway, or a base station controller. In the figures, a base station (BS) is used as an example of a network entity to describe the embodiments. In the previous embodiment, the network entity transmitted the ARP or neighbor discovery-related messages to the MSS. In the process, the data could fail to reach the destination MSS if the MSS was in sleep or idle-mode. However, in this embodiment, the network entity can respond directly to the ARP request or neighbor solicitation from the router. To this end, the network entity has to possess the IP address and the link-layer address (MAC address or Ethernet address) of the MSS.

To possess the addresses, the network entity can acquire the MSS IP address and the link-layer address when the MSS registers with the network entity to enter sleep mode or idle-mode or by searching the MSS IP address setting. More specifically, the network entity can acquire the IP address by receiving directly from the MSS the IP address when the MSS transmits the IP address via a request message. In addition, the network entity can acquire the IP address by the MSS requesting the network entity to use the IP address currently retained in the network entity. In other words, the MSS does not transmit an IP address and maintains its IP address retained in the network entity. The network entity can also acquire the information by making a direct request to the MSS for the IP and link-layer addresses.

Figure 7:
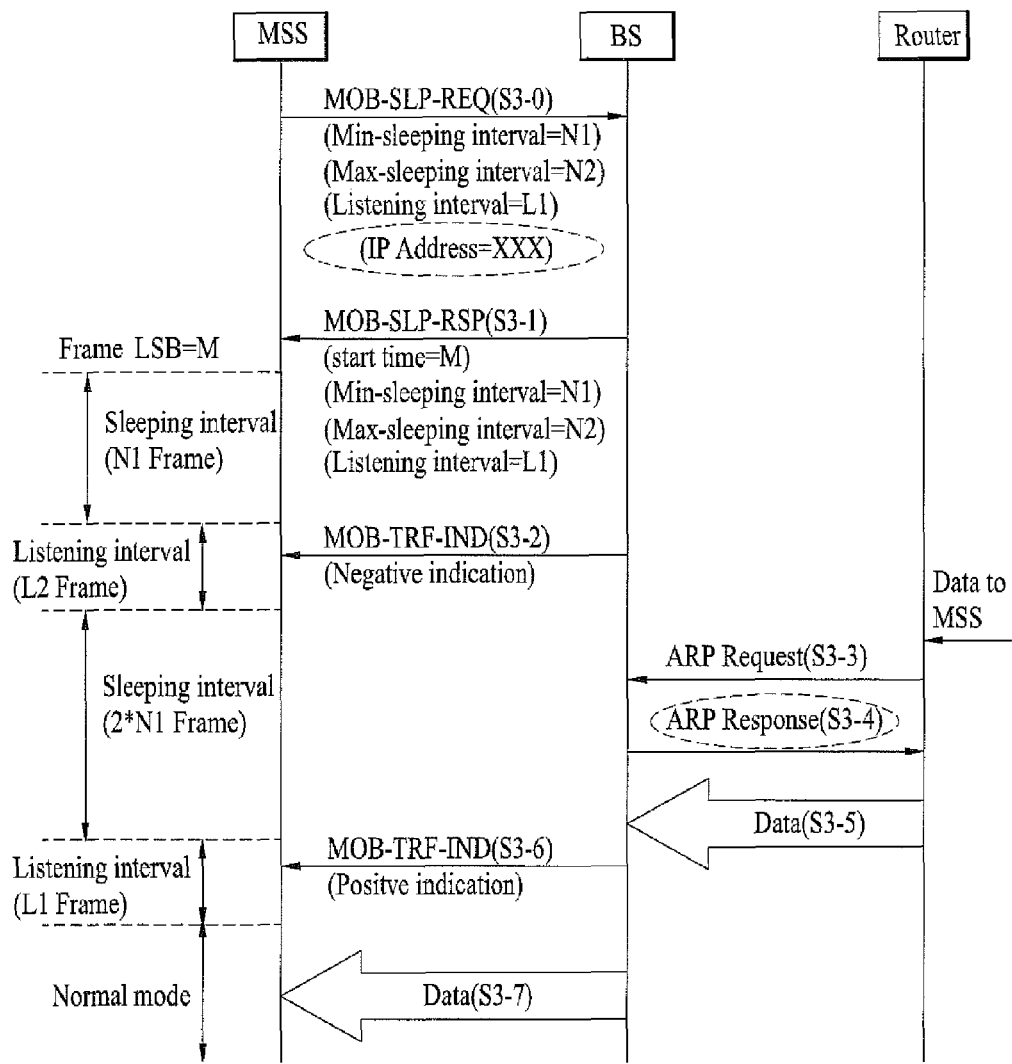
FIG. 7 illustrate a link-layer address acquisition process of a router when the MSS voluntarily enters sleep mode.

FIG. 7 illustrates a link-layer address acquisition process of a router when the MSS voluntarily enters sleep mode. Referring to FIG. 7, the MSS transmits a MOB-SLP-REQ message to the network entity to request to enter sleep mode (S3-0). In the request message, the MSS includes its IP address to allow the network entity to respond to possible future ARP requests from the router. In response to the request, the network entity transmits the MOB-SLP-RSP message to the MSS (S3-1).

Upon receiving the response message from the network entity, the MSS enters sleep mode for duration specified in the MOB-SLP-RSP message. After the sleeping interval, the MSS wakes up for listening interval (L1) to receive the MOB-TRF-END message from the network entity and determine whether there is any downlink data to receive (S3-2). If there is no downlink data to receive, the MSS re-enters sleep mode for an increased sleeping interval (2*N1). Here, the sleeping interval increases by a specified amount (i.e., double the previous sleeping interval) after a listening interval.

Figure 8:
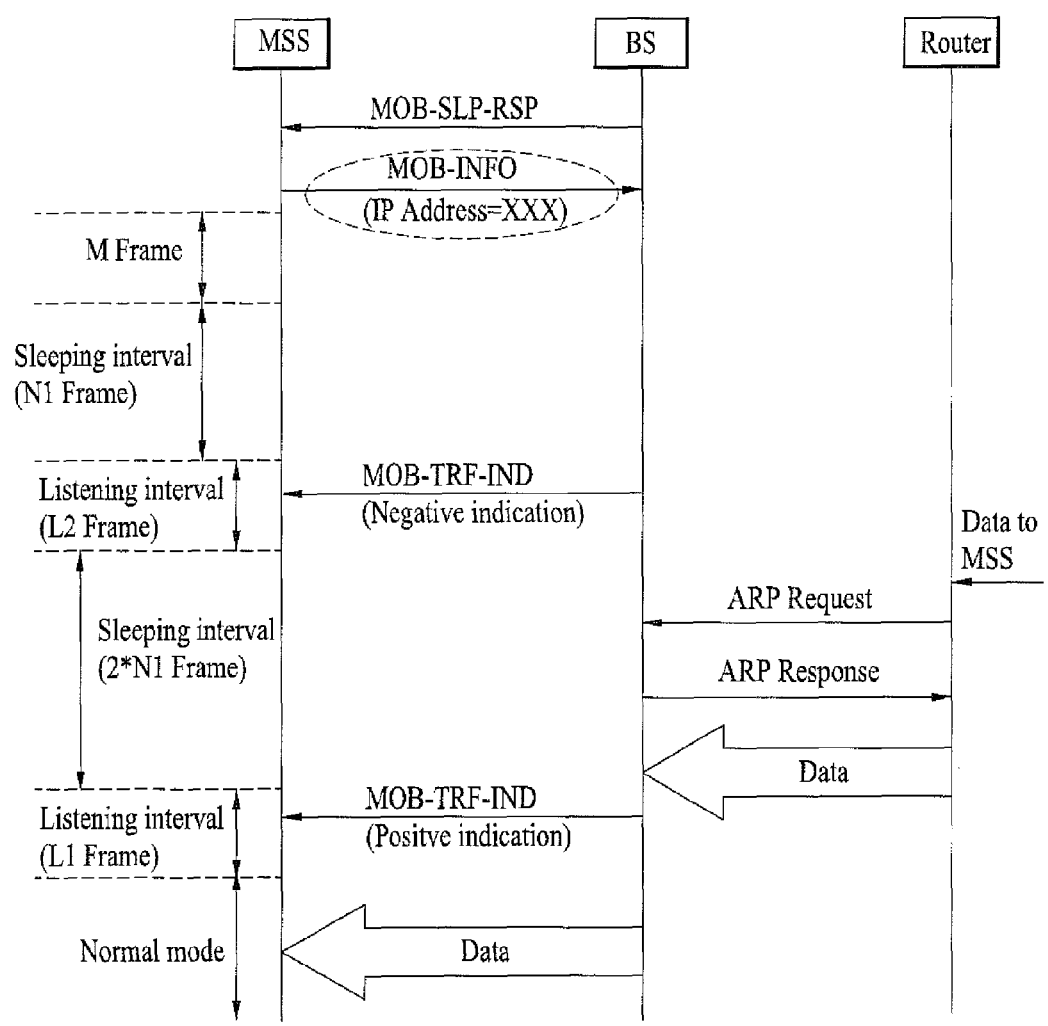
FIG. 8 illustrates a link-layer address acquisition process of a router when the MSS enters sleep mode as a result of command from the network entity.

FIG. 8 illustrates a link-layer address acquisition process of a router when the MSS enters sleep mode as a result of command from the network entity. Referring to FIG. 8, the process is similar to FIG. 7. In FIG. 8, however, instead of providing the MSS IP address via a request message, the MSS IP address is transmitted via an information message since a decision to enter sleep mode is made by the network entity in this embodiment. It is also possible to repeat the process of transmitting the DREG-REQ message and the DREG-RSP message after the MSS receives the DREG-CMD message to enter idle-mode. In this case, the MSS IP address would be transmitted via the DREG-REQ message.

Figure 9:
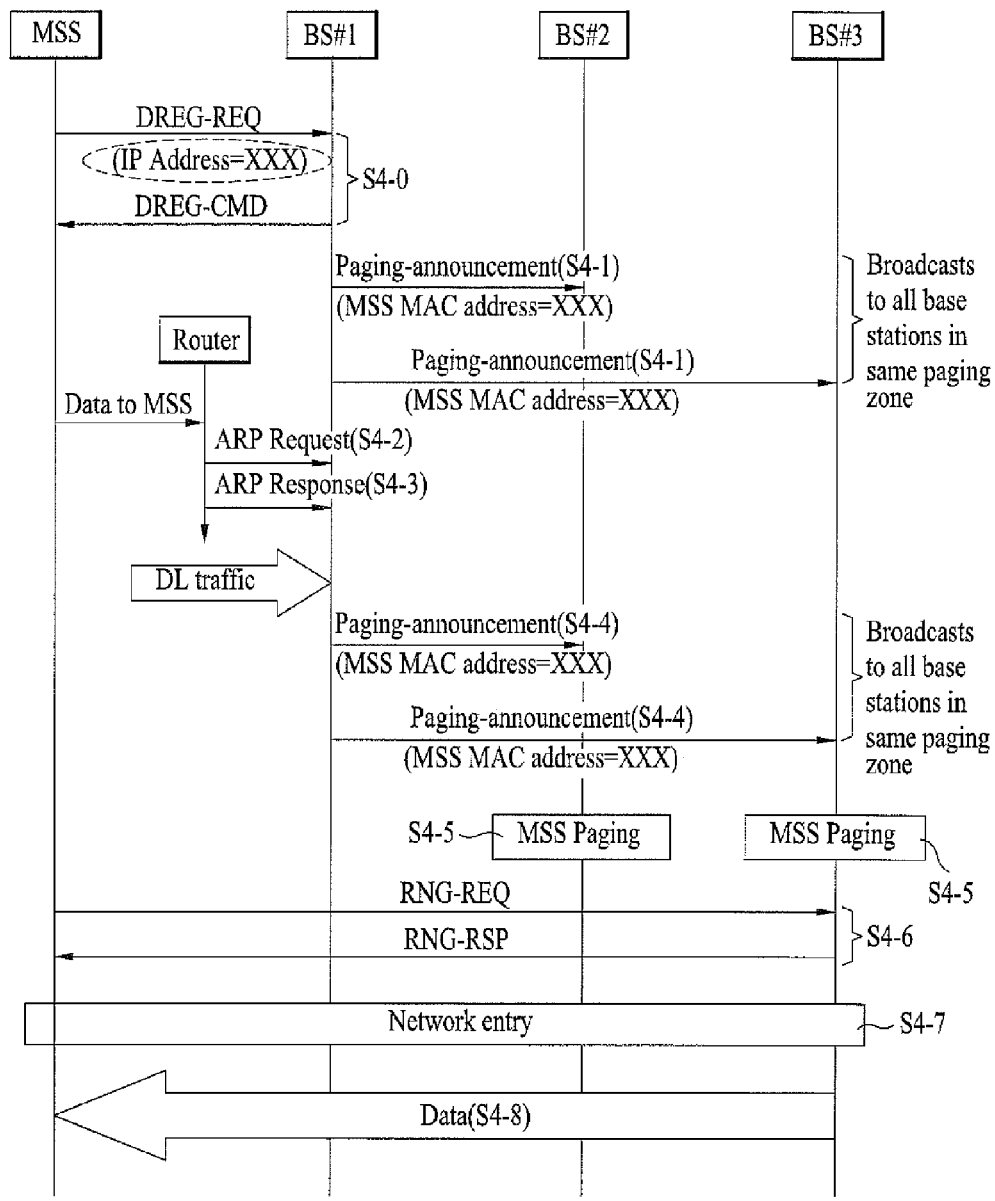
FIG. 9 illustrates a link-layer address acquisition process of a router when the MSS voluntarily enters idle-mode.

FIG. 9 illustrates a link-layer address acquisition process of a router when the MSS voluntarily enters idle-mode. In FIG. 9, the MSS transmits the DREG-REQ message to a first network entity in order to enter idle-mode, and in response, the first network entity transmits the DREG-CMD message to grant the MSS to enter sleep mode (S4-0). In the DREG-REQ message, the MSS includes its IP address to the first network entity so that when the MSS is in idle-mode, the BS can respond to the router's ARP request without having to refer to the MSS.

After the MSS has been de-registered from the first network entity (or host BS), the first network entity broadcasts to all other BSs in the same paging zone that the MSS has entered idle-mode (S4-1). The BSs who received the broadcast then adds to its paging list the MSS information.

When the router receives an IP packet, the router transmits the ARP request to the host BS to determine the MAC address of the destination IP address of the MSS (S4-2). In response, the host BS transmits an ARP response message to the router for the MSS since the host BS has the necessary IP address information of the MSS (S4-3).

Upon receipt of the ARP response message, the router transmits the IP packet to the host BS. Thereafter, the host BS transmits a paging announcement notifying all the BSs in the paging zone that there is downlink data for the MSS (S4-4). After receiving the paging announcement, the BS having the MSS in its cell coverage area transmits a paging message to the MSS at specified paging cycle(s) (S4-5).

Figure 10:
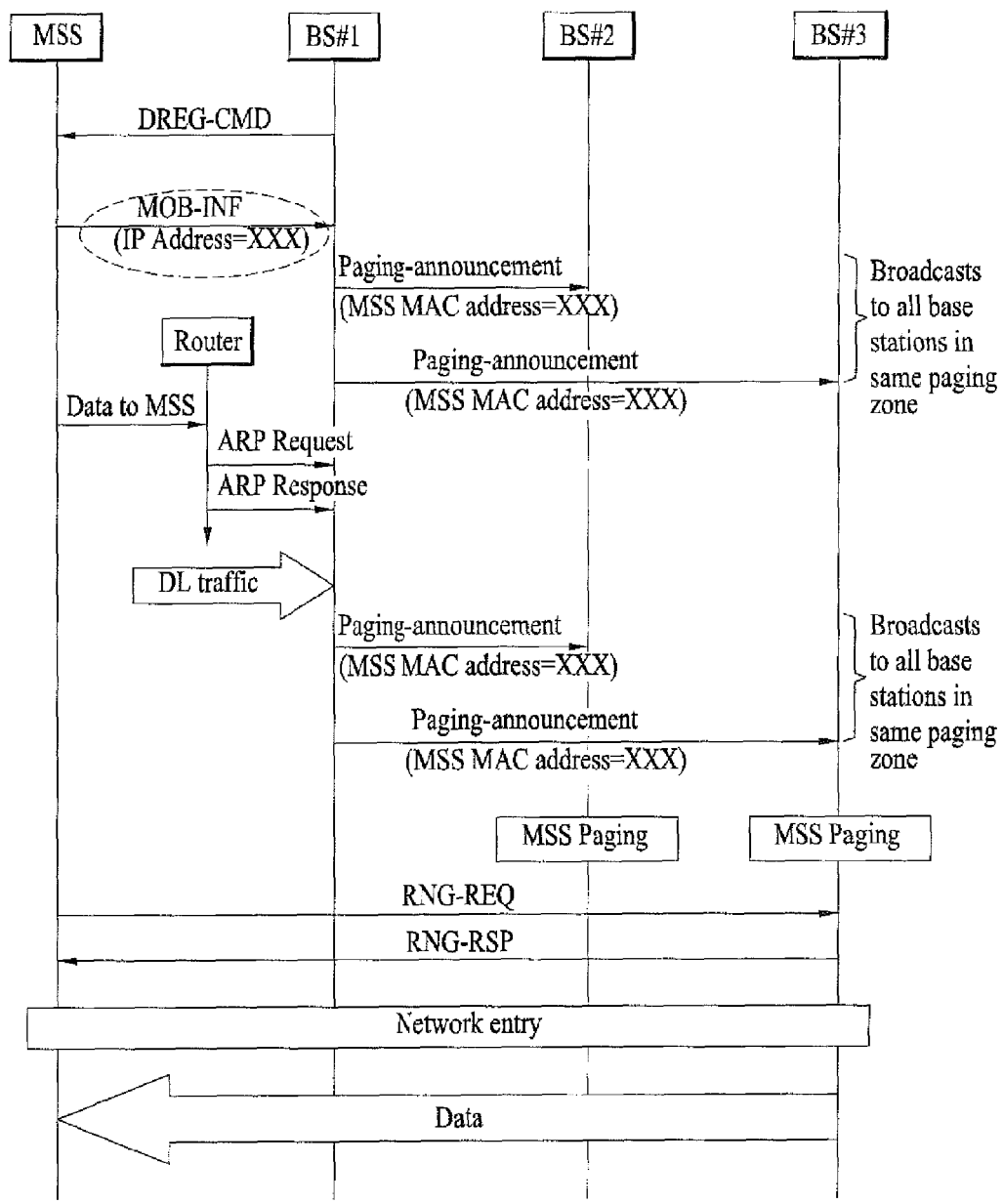
FIG. 10 illustrates a link-layer address acquisition process of a router when the MSS enters sleep mode as a result of command from the network entity.

FIG. 10 illustrates another embodiment of the present invention. This illustration shows a link-layer address acquisition process of a router when the MSS enters sleep mode as a result of command from the network entity. Referring to FIG. 10, the processes with respect to communicating between the MSS and network entities are similar to FIG. 9. In FIG. 10, however, instead of providing the MSS IP address via a request message, the MSS IP address can be transmitted via an information message since a decision to enter sleep mode is made by the network entity in this embodiment. It is also possible to repeat the process of transmitting the DREG-REQ message and the DREG-RSP message after the MSS receives the DREG-CMD message to enter idle-mode. In this case, the MSS IP address would be transmitted via the DREG-REQ message.

In another embodiment of the present invention, the MSS makes a request to the network entity to retain convergence sublayer information. Convergence sublayer is typically layer 2 protocols which are responsible for gathering and formatting of higher layer information so that it may be processed by the lower layers.

Figure 11:
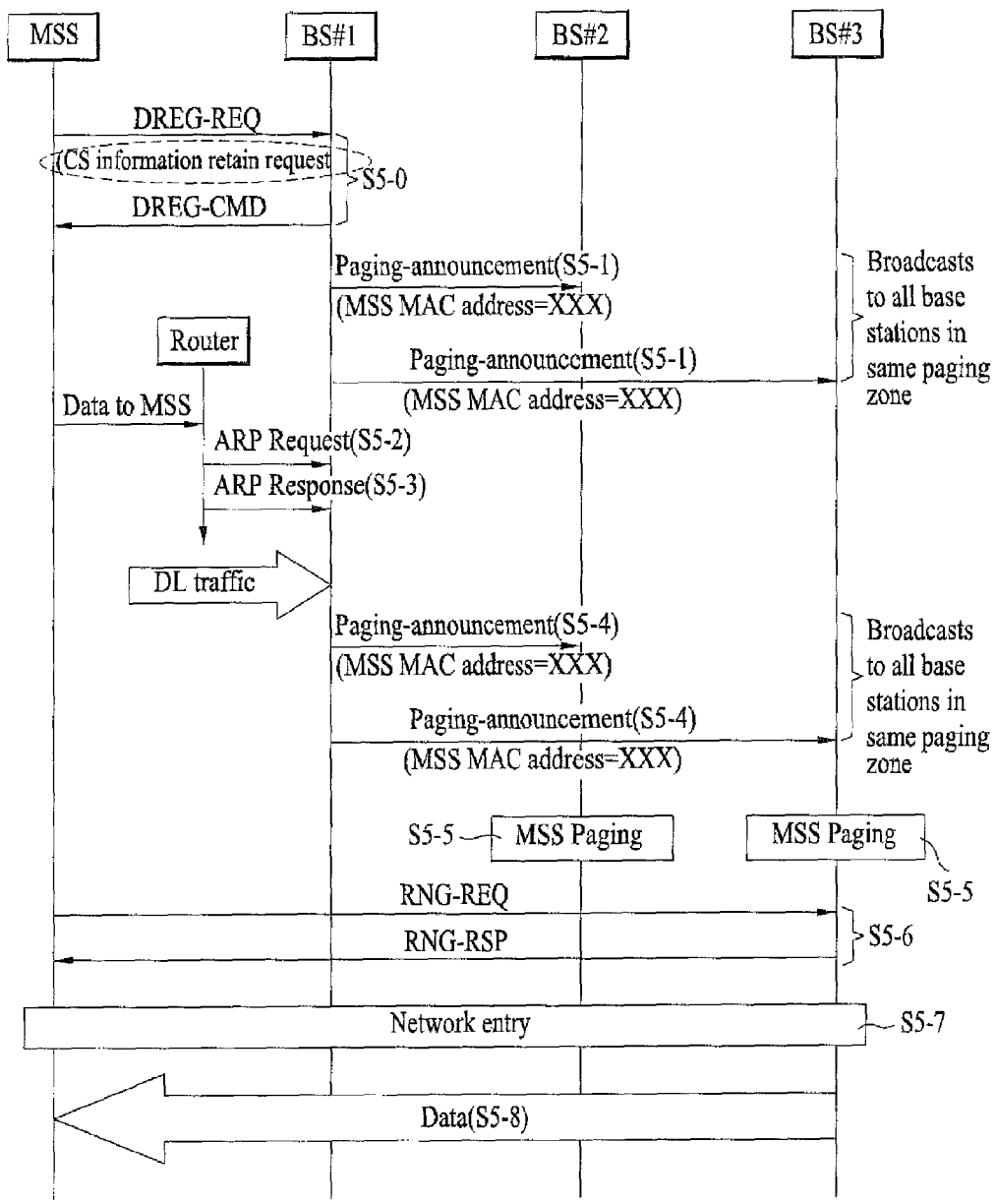
FIG. 11 illustrates another embodiment of a link-layer address acquisition process of a router when the MSS voluntarily enters idle-mode.

FIG. 11 illustrates another embodiment of a link-layer address acquisition process of a router when the MSS voluntarily enters idle-mode. Referring to FIG. 11, the operation and processes of this embodiment is similar to the processes of FIG. 9. Hence, the same processes with respect to the embodiment of FIG. 9 will be excluded.

In this embodiment, the MSS transmits the DREG-REQ message to a first network entity in order to enter idle-mode, and in response, the first network entity transmits the DREG-CMD message to grant the MSS to enter sleep mode (S5-0). In the DREG-REQ message, the MSS includes a request to retain convergence sublayer (CS) information. By having the first network entity retain the CS information, the first network entity can respond to a request from a router without having to contact the MSS in idle-mode in connection with downlink traffic. In effect, downlink traffic can be more effectively and efficiently delivered and resources of the network can be better utilized. As explained above, the remaining processes of the embodiment is same as the processes of FIG. 9.

Figure 12:
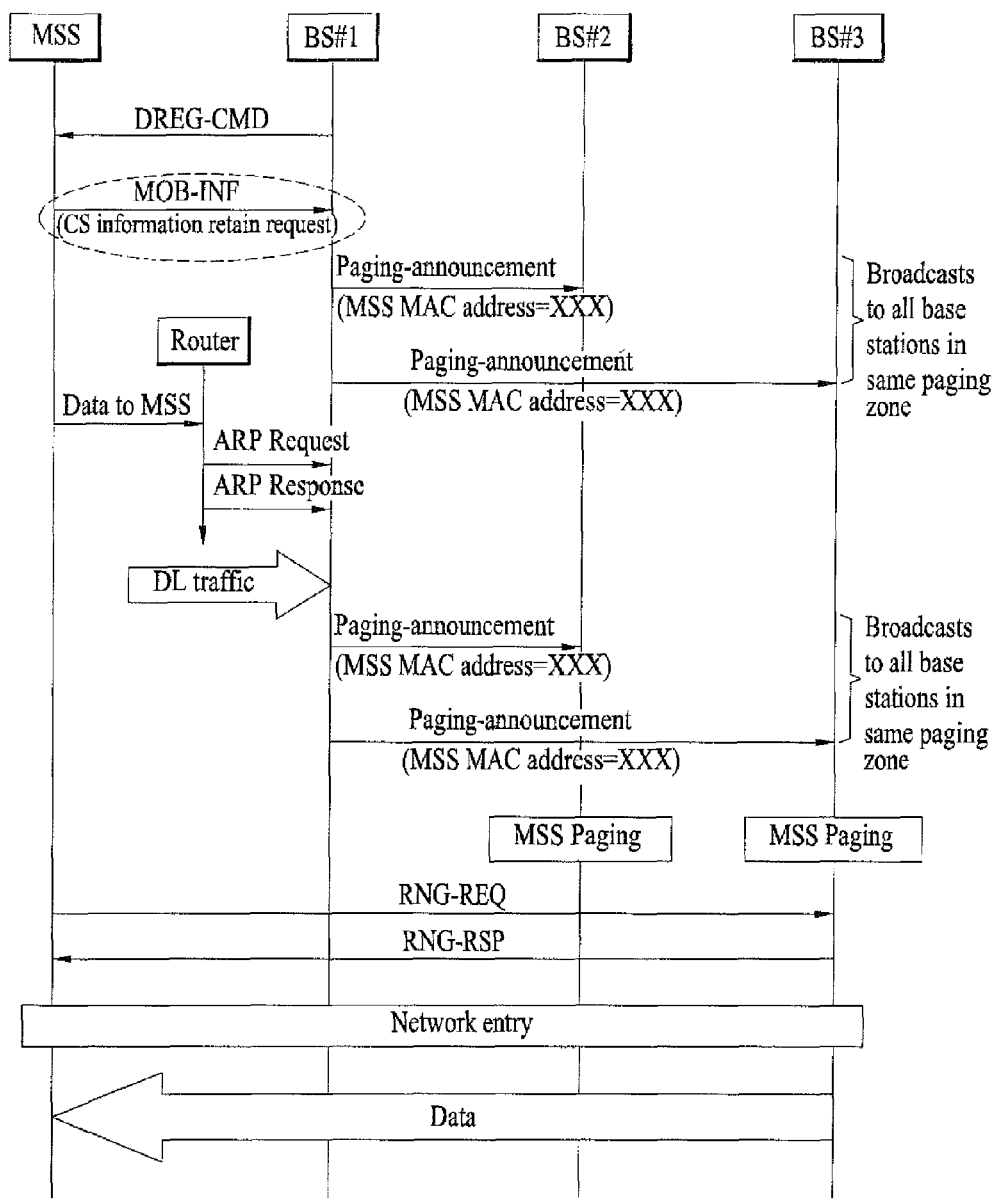
FIG. 12 illustrates a link-layer address acquisition process of a router when the MSS enters sleep mode as a result of command from the network entity.

In addition, FIG. 12 illustrates another embodiment of the present invention. Here, the embodiment represents a link-layer address acquisition process of a router when the MSS enters sleep mode as a result of command from the network entity. Referring to FIG. 12, the processes with respect to communicating between the MSS and network entities are similar to the processes of FIG. 11. In FIG. 12, however, instead of providing the MSS IP address via a request message, the MSS transmits a request message to the first network entity to retain CS information. This request can be transmitted via an information message or alternatively, via a DREG-REQ message. The rest of the processes are same as FIG. 11.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of communicating data for performing network re-entry of a mobile station (MS) in a wireless communication system, the method comprising:

transmitting a deregistration request message comprising first idle-mode retain information to a first network entity;

receiving a deregistration command message comprising second idle-mode retain information;

deregistering from the first network entity and entering an idle mode; and performing a network re-entry with a second network entity based on information retained for expediting the network re-entry, wherein each of the first and the second idle-mode retain information indicates MS service and operational information to be retained, wherein the MS service and operational information includes capability information, security information, registration information, and network address information, wherein each of the first and the second idle-mode retain information has a bitmap form, and wherein each bit location of the bitmap indicates capability information, the security information, the registration information, or network address information.

2. The method of claim 1, wherein the first network entity is a serving base station.

3. The method of claim 1, wherein the information retained for expediting the network re-entry is obtained via a backbone network.

4. The method of claim 1, wherein the deregistration request message further comprises a request to initiate the idle-mode.

5. The method of claim 1, wherein each of the first and the second idle-mode retain information is associated with:

a capability of the MS indicated by a first bit of the bitmap, security information indicated by a second bit of the bitmap, registration information indicated by a third bit of the bitmap, and a network address indicated by a fourth bit of the bitmap.

6. The method of claim 5, wherein the first bit of the bitmap relates to retaining service and operational information associated with SBC-REQ/RSP messages, the second bit of the bitmap relates to retaining service and operational information associated with PKM-REQ/RSP messages, the third bit of the bitmap relates to retaining service and operational information associated with REG-REQ/RSP messages, and the fourth bit of the bitmap relates to retaining service and operational information associated with a network address.

7. A method of communicating data for expediting a network re-entry of a mobile station (MS) in a wireless communication system, the method comprising:

receiving a deregistration request message comprising first idle-mode retain information;

transmitting a deregistration command message comprising second idle-mode retain information to a first network entity; and deregistering with the MS, retaining MS service and operation information;

performing network re-entry with the MS, wherein the network re-entry with is performed based on information retained for expediting the network re-entry, wherein each of the first and the second idle-mode retain information indicates MS service and operational information to be retained, wherein the MS service and operational information includes capability information, security information, registration information, and network address information, wherein each of the first and the second idle-mode retain information has a bitmap form, and wherein each bit location of the bitmap indicates capability information, security information, registration information, or network address information.

8. The method of claim 7, wherein the first network entity is a serving base station.

9. The method of claim 7, further comprising obtaining the information for expediting the network re-entry via a backbone network.

10. The method of claim 7, wherein each of the first and the second idle-mode retain information is associated with a capability of the MS indicated by a first bit of the bitmap, security information indicated by a second bit of the bitmap, registration information indicated by a third bit of the bitmap, and a network address indicated by a fourth bit of the bitmap.

11. The method of claim 10, wherein the first bit of the bitmap relates to retaining service and operational information associated with SBC-REQ/RSP messages, the second bit of the bitmap relates to retaining service and operational information associated with PKM-REQ/RSP messages, the third bit of the bitmap relates to retaining service and operational information associated with REG-REQ/RSP messages, and the fourth bit of the bitmap relates to retaining service and operational information associated with a network address.

12. The method of claim 1, wherein performing the network re-entry comprises:

transmitting a range request message to the second network entity; and receiving a range response message from the second network entity, wherein the range response message includes information indicating an omission of re-entry procedure.

13. The method of claim 12, wherein performing the network re-entry further comprises omitting at least one procedure indicated by the information indicating the omission of the re-entry procedure.

14. The method of claim 12, wherein the information indicating the omission of the re-entry procedure is based on the information retained for expediting the network re-entry.

15. The method of claim 1, further comprising:

receiving an unsolicited deregistration command message prior to transmitting the deregistration request message, wherein the unsolicited deregistration command message includes a command for the MS to enter the idle mode.

16. The method of claim 15, wherein the unsolicited deregistration command message further includes a time duration within which the MS is configured to send a request to enter the idle mode.

17. The method of claim 7, wherein performing the network re-entry further comprises:

transmitting a range request message to a second network entity; and receiving a range response message, wherein the range response message includes information indicating an omission of re-entry procedure.

18. The method of claim 17, wherein the performing the network re-entry further comprises omitting at least one procedure indicated by the information indicating the omission of the re-entry procedure.

19. The method of claim 17, wherein the information indicating the omission of the re-entry procedure is based on the information retained for expediting the network re-entry.

20. The method of claim 7, further comprising:

transmitting an unsolicited de-registration command message prior to the receiving of the deregistration request message, wherein the unsolicited de-registration command message includes a command for the MS to enter the idle mode.

21. The method of claim 20, wherein the unsolicited deregistration command message further includes a time duration within which the MS is configured to send a request to enter the idle mode.

* * * * *